United States Patent Office 3,492,303
Patented Jan. 27, 1970

3,492,303
1,2,3,4,4a,5,6,8,9,14,14b,14c-DODECAHYDROBENZ-
[h]INDOLO[2,3-a]QUINOLIZINES
John Shavel, Jr., Mendham, and Glenn Curtis Morrison, Dover, N.J., assignors to Warner-Lambert Pharmceutical Company, Morris Plains, N.J., a corporation of Delaware
No Drawing. Continuation-in-part of application Ser. No. 537,251, Feb. 9, 1966. This application July 28, 1967, Ser. No. 656,694
Int. Cl. C07d 57/02, 39/12; A61k 27/00
U.S. Cl. 260—286
10 Claims

ABSTRACT OF THE DISCLOSURE

The present invention relates to 1,2,3,4,4a,5,6,8,9,14,-14b,14c-dodecahydrobenz[h]indolo[2,3-a]quinolizines, in which X is hydrogen and lower alkyl, lower alkoxy, halogen, amino, N,N-disubstituted amino and etherified mercapto; and R is hydrogen, lower alkyl, phenyl lower alkyl, substituted phenyl lower alkyl and acyl.

---

These compounds are useful as central nervous system depressants.

The present application is a continuation-in-part application of our co-pending application, Ser. No. 537,251, filed Feb. 9, 1966 now abandoned.

This invention relates to new and useful heterocyclic compounds and relates more particularly to new and novel 1,2,3,4,4a,5,6,8,9,14,14b,14c - dodecahydrobenz[h]indolo[2,3-a]quinolizines having the formula:

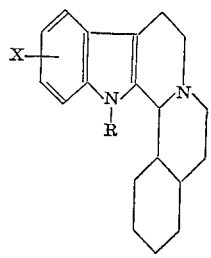

wherein X represents hydrogen, lower alkyl such as methyl, ethyl, isobutyl, hexyl and the like; lower alkoxy such as methoxy and ethoxy; halogen such as fluorine, chlorine and bromine, amino, N,N-disubstituted amino and the like; etherified mercapto such as methylmercapto and ethylmercapto, nitro and hydroxyl; and R represents hydrogen, lower alkyl such as methyl, ethyl, propyl, isobutyl, hexyl and the like, phenyl, lower alkyl such as phenethyl, substituted phenyl lower alkyl such as halogen substituted benzyl, nitrobenzyl, lower alkoxy substituted benzyl; and the acyl residue of a carboxylic acid such as acetyl, benzoyl and the like.

The numbering of the compounds of this invention is as follows:

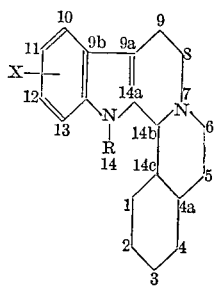

The use of a dot at ring junctions, as in structure (4) below denotes beta orientation of the hydrogen atom whereas the use of a dotted line denotes alpha orientation of the hydrogen atom. Since all the compounds described in this patent are d, 1 mixtures, the above stereochemical designations are only relative and each structure is to be considered as only one of the two mirror images.

Also embraced within the scope of this invention are the pharmaceutically accepted acid addition salts of the above-described bases, their quaternary ammonium salts and N-oxides.

The symbols R and X as used hereinafter have the same meaning described above.

The invention also includes within its scope a new and novel process for preparing the above compounds as well as the intermediates employed for their synthesis.

The new and novel compounds of this invention have interesting and significant pharmacological activity and are useful as central nervous system depressants, for mammals.

In order to use these compounds or their salts as central nervous system depressants, the selected compound from about 1 mg. to 100 mg. is combined with a pharmaceutical carrier, such as starch, mannitol, or lactone to form dosage forms such as tablets and capsules or with water or vegetable oil to form solutions and suspensions suitable for parenteral administration. They may be administered orally or parenterally, at a dosage of about 1 mg. to 100 mg. several times daily to produce the desired depressant effect.

In addition they are valuable intermediates in the production of other compounds of the 1,2,3,4,4a,5,6,8,9,14,-14b,14c - dodecahydrobenz[h]indolo[2,3 - a]quinolizine series.

The compounds of this invention are prepared by reacting 2-(carboethoxymethyl)cyclohexanone with ethyl chloracetate to form a glycidic ester of the formula:

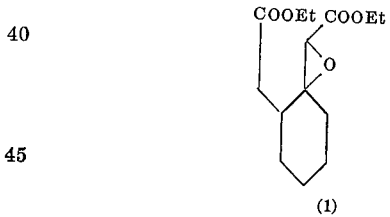

(1)

This reaction is usually carried out in an alcoholic solvent such as t-butanol at below room temperature, particularly at 0–15° C. using an alkali metal salt of the alcohol such as potassium t-butoxide as a catalyst.

The ester (1) is converted to its corresponding dicarboxylic acid by treatment first with an alkali metal hydroxide such as sodium hydroxide and then a mineral acid such as hydrochloric acid. The intermediate acid is then heated in the presence of copper powder at an elevated temperature of 150–300° C., more particularly near 250° C. in vacuo. The pyrolysate is a mixture of the acid aldehyde (2) and its enol lactone (2A) having the formulae:

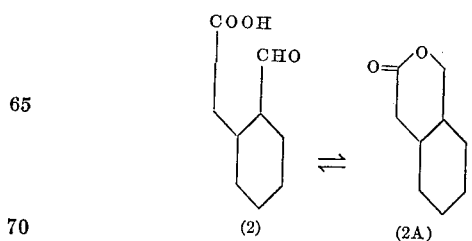

(2) (2A)

This mixture can be converted to the acid aldehyde by hydrolysis with a dilute acid such as acetic acid. The pure acid aldehyde may be isolated in the form of an aldehyde derivative such as a semicarbazone.

On reacting the acid aldehyde (2) with a tryptamine of the formula:

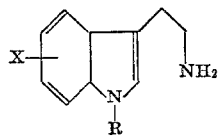

there is produced a lactam of the formula:

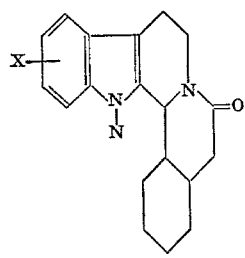

(3)

The reaction is carried out by heating the tryptamine and acid aldehyde intermediate in an acidic medium such as refluxing acetic acid.

Reduction of the lactam (3) with a metal hydride such as lithium aluminum hydride results in the desired 1,2,3,4,4a,5,6,8,9,14,14b,14c - dodecahydrobenz[h]indodo[2,3-a]quinolizine of the formulae:

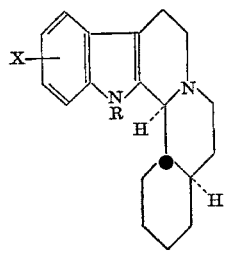 and 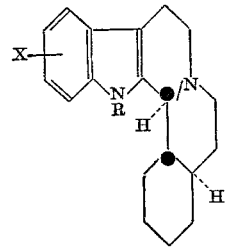

(4) (5)

The procedure allows the isolation of the trans-anti- (4) and trans-syn (5) isomers (trans refers to the relationship of hydrogens 4a and 14c, anti to hydrogens 14b and 14c).

To obtain the cis isomers, compound (4) is oxidized with t-butyl hypochlorite to a dehydro compounds (6) of the formula:

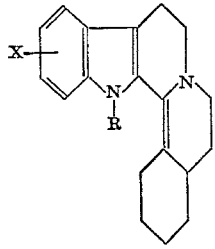

(6)

Reduction of the hydrochloride of (6) with platinum oxide in ethanol gives the cis-syn isomer (7). Reduction with zinc and perchloric acid gives in addition to the previously obtained cis isomer, the cis-anti isomer (8).

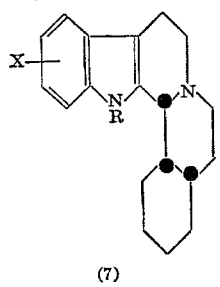 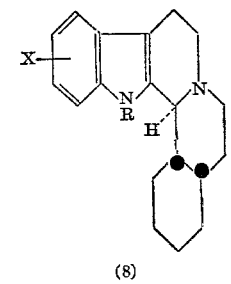

(7) (8)

All the above described stereo isomers where R is hydrogen and X is hydrogen may be alkylated such as by methylation with sodium hydride and dimethyl carbonate to yield the corresponding alkyl derivative.

The compounds of this invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate. The N-oxides are obtained by treating the free base with an oxidizing agent such as hydrogen peroxide.

The following examples are included in order further to illustrate the invention. Temperatures are given in degrees centigrade.

EXAMPLE 1

Ethyl 1,α-epoxy-2-(ethoxycarbonylmethyl)cyclohexane acetate

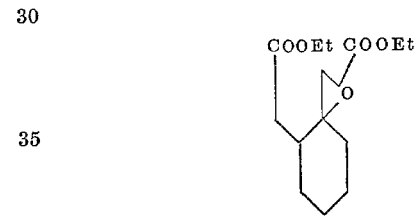

To a mixture of 630 g. of 2-(carboethoxymethyl)cyclohexanone and 420 g. of ethylchloroacetate is added a solution of 384 g. of potassium tert.-butoxide in 3.2 l. of tert.-butanol over a 2 hr. interval with cooling such that the temperature is maintained at 0–15°. After the addition has been completed stirring is continued for 2 hr. at 0–15° and then 15 hr. at room temperature. The solvent is removed in vacuo and the residue is treated with an ether-water mixture. The ether layer is washed with saturated sodium bicarbonate solution and water, dried over sodium sulfate, and the solvent is removed. Distillation of the residue gives 572 g. (61%) of ethyl 1,α-epoxy-2 - (ethoxycarbonylmethyl)cyclohexane acetate in the form of an oil, B.P. 128–130° (0.2 mm.); $n_D^{23}$ 1.4646.

Analysis for $C_{14}H_{22}O_5$.—Calcd.: C, 62.20; H, 8.20. Found: C, 62.18; H, 8.11.

EXAMPLE 2

2-formylcyclohexaneacetic acid

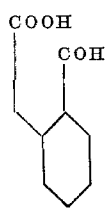

To a solution of 100 g. of sodium in 1650 ml. of ethanol which has been previously cooled to 10° is added 590 g. of ethyl 1,α-epoxy-2-(ethoxycarbonylmethyl)cyclohexaneacetate. The mixture is cooled to 5° and 91.7 ml.

of water added dropwise with cooling such that the temperature remains at 0–15°. On standing at room temperature for 15 hr. there is deposited 446 g. of a crystalline solid, M.P. 330°. The salt is dissolved in 480 ml. of water and 288 ml. of hydrochloric acid added with cooling such that the temperature remains at 10–15°. The solution is extracted with 3.0 and 1.0 l. portions of ether. The combined ether layers are washed with 100 ml. of water, dried over sodium sulfate, and the solvent is removed. The residue (340 g.) and 10 g. of copper powder is pyrolyzed at 250° (100 mm.) for 5 hr. There is collected 185 g. of a mixture, B.P. 50–192° (100 mm.), which is refluxed vigorously with a solution of 73 ml. of acetic acid in 1400 ml. of water for 10 hr. The mixture is extracted with chloroform. The chloroform layer is dried over sodium sulfate and the solvent is removed. There remains 155 g. (43%) of 2-formylcyclohexaneacetic acid in the form of an oil.

A 1.0 g. sample of the oil gives 0.65 g. (48%) of the corresponding *semicarbazone* as a crystalline solid, M.P. 172–173.5° dec.

Analysis for $C_{10}H_{17}N_3O_3$.—Calcd.: C, 52.85; H, 7.54; N, 18.49. Found: C, 52.65; H, 7.78; N, 18.41.

EXAMPLE 3

Trans-anti-1,2,3,4,4a,5,6,8,9,14,14b,14c-dodecahydro-benz[a]indolo[2,3-h]quinolizin-6-one

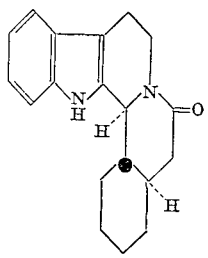

A solution of 94 g. of tryptamine and 100 g. of 2-formylcyclohexaneacetic acid in 860 ml. of acetic acid is refluxed for 2 hr. On standing there is deposited a solid which after tituration with 3 l. of hot ethanol gives 106 g. (61%) of trans-anti-1,2,3,4,4a,5,6,8,9,14,14b,14c-dodecahydrobenz[a]indolo[2,3-h]quinolizin-6-one as a crystalline solid, M.P. 264–266°. Recrystallization from ethanol gives an analytical sample, M.P. 265.5–266.5°.

Analysis for $C_{19}H_{22}N_2O$.—Calcd.: C, 77.52; H, 7.53; N, 9.52. Found: C, 77.23; H, 7.61; N, 9.66.

EXAMPLE 4

Trans-anti-1,2,3,4,4a,5,6,8,9,14,14b,14c-dodecahydro-benz[a]indolo[2,3-h]quinolizine

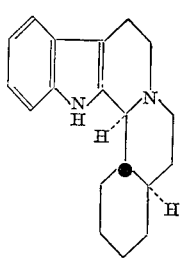

To a suspension of 4.0 g. of lithium aluminum hydride in 220 ml. of tetrahydrofuran a solution of 2.25 g. of trans - anti - 1,2,3,4,4a,5,6,8,9,14,14b,14c - dodecahydrobenz[a]indolo[2,3-h]quinolizin-6-one in 400 ml. of warm tetrahydrofuran is added at a rate such that the mixture does not reflux. After the addition has been completed the mixture is refluxed for 5 hr. The excess lithium alumi-num hydride is destroyed by the cautious dropwise addition of water. The reaction mixture is filtered and the solvent removed. Recrystallization of the residue from ethanol gives 1.6 g. of trans-anti-1,2,3,4,4a,5,6,8,9,14,14b,14c-dodecahydrobenz[a]indolo[2,3-h]quinolizine (74%), M.P. 169–170° (evacuated capillary).

Analysis for $C_{19}H_{24}N_2$.—Calcd.: C, 81.38; H, 8.63; N, 9.99. Found: C, 81.44; H, 8.71; N, 10.21.

EXAMPLE 5

Trans-syn-1,2,3,4,4a,5,6,8,9,14,14b,14c-dodecahydro-benz[a]indolo[2,3-h]quinolizine

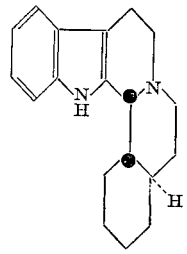

To a suspension of 4.0 g. of lithium aluminum hydride in 220 ml. of tetrahydrofuran a solution of 2.25 g. of mixed 1,2,3,4,4a5,6,8,9,14,14b,14c - dodecahydrobenz[a]indolo[2,3-h]quinolizin-6-ones in 400 ml. of warm tetrahydrofuran is added at a rate such that the mixture does not reflux. After the addition has been completed the mixture is refluxed for 5 hr. The excess lithium aluminum hydride is destroyed by the cautious dropwise addition of water. The reaction mixture is filtered and the solvent removed. Chromatography on alumina gives on elution with benzene a solid which after recrystallization from methanol affords 3.0 g. (7%) of trans-syn-1,2,3,4,4a,5,6,8,9,14,14b,14c - dodecahydrobenz[a]indolo[2,3-h]quinolizine as a solid. M.P. 135–136°. Recrystallization from Skelly solve B gives an analytical sample, M.P. 135.5–136.5°.

Analysis for $C_{19}H_{24}N_2$.—Calcd.: C, 81.38; H, 8.63; N, 9.99. Found: C, 81.68; H, 8.60; N, 9.77.

EXAMPLE 6

2,3,4,4a,5,6,8,9,14,14c - decahydro - 1H-benz[a]indolo[2,3,-h]quinolizinium chloride

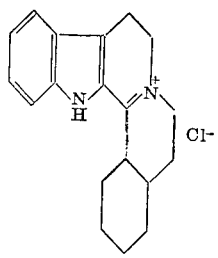

To a solution of 10.9 g. of trans-anti-1,2,3,4,4a,5,6,8,9,14,14b,14c - dodecahydrobenz[a]indolo[2,3 - h]quinolizine and 5.5 ml. of triethylamine in 500 ml. of methylenechloride is cooled to −10° C. and over a 40 min. interval a solution of 4.9 g. of tert.butyl hypochlorite in 30 ml. of carbon tetrachloride is added with cooling such that the temperature remains at −10°. After the addition has been completed stirring is continued at −10° for 10 min. and then the cooling bath removed and stirring continued for an additional 15 min. The reaction mixture is washed with water, dried over sodium sulfate, made acidic with ethereal hydrogen chloride, and the solvent is removed. The residue after three recrystallizations from ethanol-dioxane gives 7.5 g. (61%) of 2,3,4,4a,5,6,8,9,14,14c-decahydro-1H-benz[a]indolo[2,3-h]quinolizinium chloride as a light yellow crystalline solid M.P. 249–250°.

Analysis for $C_{19}H_{23}N_2Cl$.—Calcd. C, 72.48; H, 7.36; N, 8.90; Cl, 11.26. Found: C, 72.78; H, 7.32; N, 8.72; Cl, 11.25.

EXAMPLE 7

Cis-syn-1,2,3,4,4a,5,6,8,9,14,14b,14c-dodecahydro-benz[a]indolo[2,3-h]quinolizine

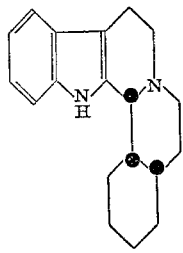

To a solution of 14.5 g. of 2,3,4,4a,5,6,8,9,14,14c-decahydro-1H - benz[a]indolo[2,3-h]quinolizinium chloride in 230 ml. of ethanol is added 1.0 g. of platinum oxide and the mixture is hydrogenated. After 5 min. the theoretical hydrogen has been absorbed. The reaction mixture is shaken with 70 ml. of 10% sodium hydroxide solution and 500 ml. of chloroform. The solution is filtered, the solvent removed, and the residue is dissolved in 1 l. of chloroform. The chloroform solution is washed with water, dried over sodium sulfate and the solvent is removed. Recrystallization of the residue from ethanol gives 10.9 g. (80%) of cis-syn-1,2,3,4,4a,5,6,8,9,14,14b,14c - dodecahydrobenz[a]indolo[2,3 - h]quinolizine as a crystalline solid, M.P. 120–121° or 145–146°.

Analysis for $C_{19}H_{24}N_2$.—Calcd: C, 81.38; H, 8.63; N, 9.99. Found: C, 81.59; H, 8.55; N, 9.83.

EXAMPLE 8

Cis-anti-1,2,3,4,4a,5,6,8,9,14,14b,14c-dodecahydro-benz[a]indolo[2,3-h]quinolizine

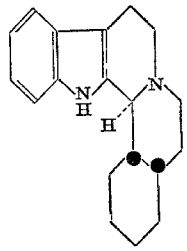

To a refluxing solution of 58 g. of 2,3,4,4a,5,6,8,9,14,14c-decahydro-1H - benz[a]indolo[2,3 - h]quinolizinium chloride, 145 ml. of perchloric acid (70%), and 725 ml. of water in 2.9 l. of methanol is added 145 g. of zinc dust portionwise during a 1 hr. period. After the addition has been completed, heating is continued for 2.5 hr. The unreacted zinc is removed by filtration and the solution concentrated to a volume of 800 ml. The solution is made basic with 20% sodium hydroxide solution and extracted with chloroform. The chloroform layer is washed with water, dried over sodium sulfate, and the solvent is removed. The residue (40 g.) is chromatographed in 1.6 kg. of alumina. Elution with benzene-ether gives 13.9 g. (35%) of cis-anti-1,2,3,4,4a,5,6,8,9,14,14b,14c-dodecahydrobenz[a]indolo[2,3 - h]quinolizine as a crystalline solid, M.P. 180–183°. Recrystallization from ethanol gives an analytical sample, M.P. 190–191°.

The early fractions from the column gives 6.4 g. (14%) of the cis-syn isomer.

Analysis for $C_{19}K_{24}N_2$.—Calcd: C, 81.38; H, 8.63; N, 9.99. Found: C, 81.28; H, 8.85; N, 9.90.

EXAMPLE 9

Trans-anti-1,2,3,4,4a,5,6,8,9,14,14b,14c-dodecahydro-14-methylbenz[a]indolo[2,3-h]quinolizine

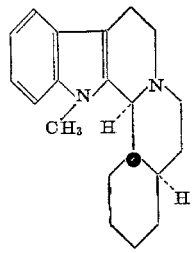

A mixture of 12 g. of trans-anti-1,2,3,4,4a,5,6,8,9,14,14b,14c-dodecahydrobenz[a]indolo[2,3-h]quinolizine, 25 g. of sodium hydride dispersion (55% in mineral oil), 80 ml. of dimethyl carbonate and 500 ml. of tetrahydrofuran is refluxed for 20 hr. The excess hydride is destroyed by the dropwise addition of water and the solvent removed in vacuo on the steam bath. The residue is treated with 1.2 l. of methylene chloride. The methylene chloride solution is washed with water, dried over sodium sulfate, and the solvent removed. After tituration of the residue with Skelly solve B there remains 7.7 g. (61%) of trans-anti-1,2,3,4,4a,5,6,8,9,14,14b,14c-dodecahydro-14-methylbenz[a]indolo[2,3 - h]quinolizine as a crystalline solid, M.P. 141–142°. Recrystallization from Skelly solve B gives an analytical sample, M.P. 144–145°.

Analysis for $C_{20}H_{26}N_2$.—Calcd: C, 81.58; H, 8.90; N, 9.52. Found: C, 81.67; H, 9.10; N, 9.23.

EXAMPLE 10

Trans-syn-1,2,3,4,4a,5,6,8,9,14,14b,14c-dodecahydro-14-methylbenz[a]indolo[2,3-h]quinolizine

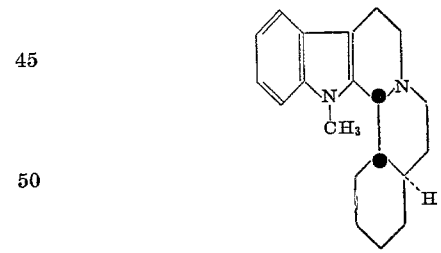

A mixture of 1.0 g. of trans-syn-1,2,3,4,4a,5,6,8,9,14,14b,14c-dodecahydrobenz[a]indolo[2,3-h]quinolizine, 5 g. of sodium hydride dispersion (55% in mineral oil), 10 ml. of dimethyl carbonate and 200 ml. of tetrahydrofuran is refluxed for 20 hr. The excess hydride is destroyed by the dropwise addition of water and the solvent removed in vacuo on the steam bath. The residue is treated with 1.2 l. of methylene chloride. The methylene chloride solution is washed with water, dried over sodium sulfate, and the solvent removed. The residue is dissolved in ether and excess hydrogen bromide added. The salt is shaken with 10% sodium hydroxide solution and methylene chloride. The methylene chloride layer is washed with water, dried over sodium sulfate, and the solvent is removed. Recrystallization of the residue from methanol gives 0.40 g. (38%) of trans-syn-1,2,3,4,4a,5,6,8,9,14,14b,14c-dodecahydro-14-methylbenz[a]indolo[2,3-h]quinolizine as a crystalline solid M.P. 124–125°.

Analysis for $C_{20}H_{26}N_2$.—Calcd.: C, 81.58; H, 8.90; N, 9.52. Found: C, 81.30; H, 8.89; N, 9.27.

EXAMPLE 11

Cis-syn-1,2,3,4,4a,5,6,8,9,14,14b,14c-dodecahydro-14-methylbenz[a]indolo[2,3-h]quinolizine

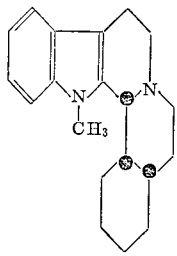

A mixture of 5.6 g. of cis-syn-1,2,3,4,4a,5,6,8,9,14,14b, 14c-dodecahydrobenz[a]indolo[2,3-h]quinolizine, 9.6 g. of sodium hydride dispersion (55% in mineral oil), 34 ml. of dimethyl carbonate and 500 ml. of tetrahydrofuran is refluxed for 20 hr. with stirring. The excess sodium hydride is destroyed by the dropwise addition of water and the solvent removed in vacuo on the steam bath. The residue is treated with 1300 ml. of chloroform and 100 ml. of water. The chloroform layer is washed with water, dried over sodium sulfate, and the solvent is removed. The residue is dissolved in 100 ml. of Skelly solve B and the solution filtered. On standing there is deposited 3.2 g. (55%) of cis-syn-1,2,3,4,4a,5,6,8,9,14,14b,14c-dodecahydro-14-methylbenz[a]indolo[2,3-h]quinolizine as a crystalline solid M.P. 143–148°. Recrystallization from methanol gives an analytical sample, M.P. 149–150°.

Analysis for $C_{20}H_{26}N_2$.—Calcd.: C, 81.58; H, 8.90; N, 9.52. Found: C, 81.52; H, 8.87; N, 9.38.

EXAMPLE 12

Cis-anti-1,2,3,4,4a,5,6,8,9,14,14b,14c-dodecahydrobenz-14-methyl[a]indolo[2,3-h]quinolizine

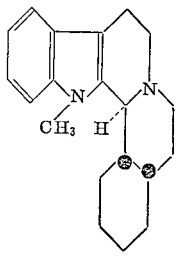

A mixture of 4.7 g. of cis-anti-1,2,3,4,4a,5,6,8,9,14,14b, 14c - dodecahydrobenz - 14 - methyl[a]indolo[2,3 - h] quinolizine, 9.6 g. of sodium hydride dispersion (55% in mineral oil), 40 ml. of dimethyl carbonate and 250 ml. of tetrahydrofuran is refluxed for 20 hr. The excess hydride is destroyed by the dropwise addition of water and the solvent is removed in vacuo on the steam bath. The residue is treated with 1 l. of chloroform and 50 ml. of water. The chloroform layer is washed with water, dried over sodium sulfate, and the solvent is removed. The residue is dissolved in 20 ml. of Skelly solve B and the solution filtered. On cooling in an icebath there is deposited 1.8 g. (36%) of a crystalline solid, M.P. 109–110°. Recrystallization from methanol gives an analytical sample, M.P. 111–112°.

Analysis for $C_{20}H_{26}N_2$.—Calcd.: C, 81.58; H, 8.90; N, 9.52. Found: C, 81.77; H, 9.11; N, 9.30.

It is understood that the foregoing detailed description is given merely by way of illustration and that many variations may be made therein without departing from the spirit of our invention.

Having described our invention, what we desire to secure by Letters Patent is:

We claim:

1. A compound selected from the group consisting of the free base of the formula:

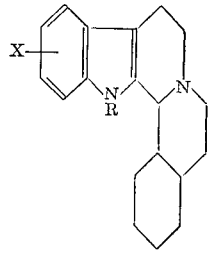

wherein X is a member selected from the group consisting of hydrogen, lower alkyl, lower alkoxy, halogen, amino, etherified mercapto, nitro and hydroxyl and R is a member selected from the group consisting of hydrogen, lower alkyl, phenyl lower alkyl, and acyl of a lower alkanoic acid and benzoic acid, the pharmaceutically acceptable acid addition salts, and the quaternary ammonium salts thereof.

2. The compound of claim 1 which is trans-anti-1,2,3,4,4a,5,6,8,9,14,14b,14c - dodecahydrobenz[a]indolo-[2,3-h]quinolizine.

3. The compound of claim 1 which is trans-syn-1,2,3, 4,4a,5,6,8,9,14,14b,14c - dodecahydrobenz[a]indolo-[2,3-h]quinolizine.

4. The compound of claim 1 which is 2,3,4,4a,5,6,8, 9,14,14c - decahydro - 1H - benz[a]indolo[2,3-h]quinolizinium chloride.

5. The compound of claim 1 which is cis-syn-1,2,3,4, 4a,5,6,8,9,14,14b,14c - dodecahydrobenz[a]indolo[2,3-h]-quinolizine.

6. The compound of claim 1 which is cis-anti-1,2,3, 4,4a,5,6,8,9,14,14b,14c - dodecahydrobenz[a]indolo[2,3-h]quinolizine.

7. The compound of claim 1 which is trans-anti-1,2, 3,4,4a,5,6,8,9,14,14b,14c-dodecahydro - 14 - methylbenz-[a]indolo[2,3-h]quinolizine.

8. The compound of claim 1 which is trans-syn-1,2,3, 4,4a,5,6,8,9,14,14b,14c - dodecahydro - 14 - methylbenz-[a]indolo[2,3-h]quinolizine.

9. The compound of claim 1 which is cis-syn-1,2,3,4, 4a,5,6,8,9,14,14b,14c - dodecahydro - 14 - methylbenz-[a]indolo[2,3-h]quinolizine.

10. The compound of claim 1 which is cis-anti-1,2, 3,4,4a,5,6,8,9,14,14b,14c - dodecahydrobenz - 14 - methyl-[a]indolo[2,3-h]quinolizine.

References Cited

UNITED STATES PATENTS

| | | | |
|---|---|---|---|
| 3,022,309 | 2/1962 | Muller | 260—287 |
| 3,087,930 | 4/1963 | Schut | 260—288 |
| 3,103,513 | 10/1963 | Nauta | 260—289 X |
| 3,219,661 | 11/1965 | Shavel et al. | 260—288 X |
| 3,240,782 | 3/1966 | Brossi et al. | 260—286 |
| 3,401,170 | 9/1968 | Shavel et al. | 260—288 |

OTHER REFERENCES

Potts et al.: J. Hetero, Chem., vol. 3, pp. 395–401 (1966), abstracted in Chem. Abstr., vol. 66, col. 28694r (1967).

DONALD G. DAUS, Primary Examiner

U.S. Cl. X.R.

260—288, 348, 468, 487, 521, 343.5, 376.15, 687